(12) United States Patent
Pooran et al.

(10) Patent No.: US 10,295,325 B1
(45) Date of Patent: May 21, 2019

(54) FLANGE CHECKING DEVICE

(71) Applicants: Derek Pooran, Markham (CA);
Matthew Narayane, Markham (CA)

(72) Inventors: Derek Pooran, Markham (CA);
Matthew Narayane, Markham (CA)

( * ) Notice: Subject to any disclaimer, the term of this patent is extended or adjusted under 35 U.S.C. 154(b) by 144 days.

(21) Appl. No.: 15/665,943

(22) Filed: Aug. 1, 2017

Related U.S. Application Data

(60) Provisional application No. 62/369,845, filed on Aug. 2, 2016.

(51) Int. Cl.
*G01B 5/28* (2006.01)
*G01B 3/22* (2006.01)

(52) U.S. Cl.
CPC .................... *G01B 3/22* (2013.01)

(58) Field of Classification Search
CPC ............................. G01B 11/306; G01B 11/30
USPC ......................................................... 33/533
See application file for complete search history.

(56) References Cited

U.S. PATENT DOCUMENTS

| | | | | |
|---|---|---|---|---|
| 1,403,156 A | * | 1/1922 | Gonzalez | G01B 5/00 33/23.02 |
| 5,711,083 A | * | 1/1998 | Bidwell | G01B 5/08 33/543 |
| 8,997,365 B2 | * | 4/2015 | Alexander | G01B 5/25 33/645 |
| 2001/0029677 A1 | * | 10/2001 | Bidwell | G01B 5/0004 33/542 |
| 2005/0198847 A1 | * | 9/2005 | Liu | G01B 5/0004 33/533 |
| 2008/0244919 A1 | * | 10/2008 | Douglas | G01B 5/10 33/203.16 |
| 2011/0113637 A1 | * | 5/2011 | Inoue | B60B 27/0005 33/203 |
| 2013/0219733 A1 | * | 8/2013 | Smith | F01D 25/285 33/645 |
| 2013/0326891 A1 | * | 12/2013 | Alexander | G01B 5/25 33/228 |
| 2015/0170978 A1 | * | 6/2015 | Chen | H01L 22/12 438/8 |
| 2018/0031360 A1 | * | 2/2018 | Narayane | G01B 5/0002 |

* cited by examiner

*Primary Examiner* — George B Bennett
(74) *Attorney, Agent, or Firm* — Kyle A. Fletcher, Esq.

(57) ABSTRACT

The flange checking device is an instrument that is configured for use in measuring the runout of a flange. The flange checking device measures lateral irregularities in the face of the flange that can cause failures in seals the flange may form. The flange checking device comprises a center shaft, a mounting structure, a measuring structure, and a measuring instrument. The mounting structure is a first adjustable structure that physically attaches the flange checking device to the flange that is to be inspected. The measuring structure is a second adjustable structure that applies the measuring instrument to the flange face. The measuring instrument measures irregularities within the flange face.

20 Claims, 5 Drawing Sheets

FLANGE CHECKING DEVICE

CROSS REFERENCES TO RELATED APPLICATIONS

This non-provisional patent application claims priority to provisional patent application 62/369,845 that was filed on Aug. 2, 2016 by the applicant, Derek Pooran and Matthew Narayane.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of instruments and measuring, more specifically, an instrument that measures irregularities of a surface area.

SUMMARY OF INVENTION

The flange checking device is an instrument that is configured for use in measuring the runout of a flange. The flange checking device measures lateral irregularities in the face of the flange that can cause failures in seals the flange may form. The flange checking device comprises a center shaft, a mounting structure, a measuring structure, and a measuring instrument. The mounting structure is a first adjustable structure that physically attaches the flange checking device to the flange that is to be inspected. The measuring structure is a second adjustable structure that applies the measuring instrument to the flange face. The measuring instrument measures irregularities within the flange face.

These together with additional objects, features and advantages of the flange checking device will be readily apparent to those of ordinary skill in the art upon reading the following detailed description of the presently preferred, but nonetheless illustrative, embodiments when taken in conjunction with the accompanying drawings.

In this respect, before explaining the current embodiments of the flange checking device in detail, it is to be understood that the flange checking device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the flange checking device.

It is therefore important that the claims be regarded as including such equivalent construction insofar as they do not depart from the spirit and scope of the flange checking device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
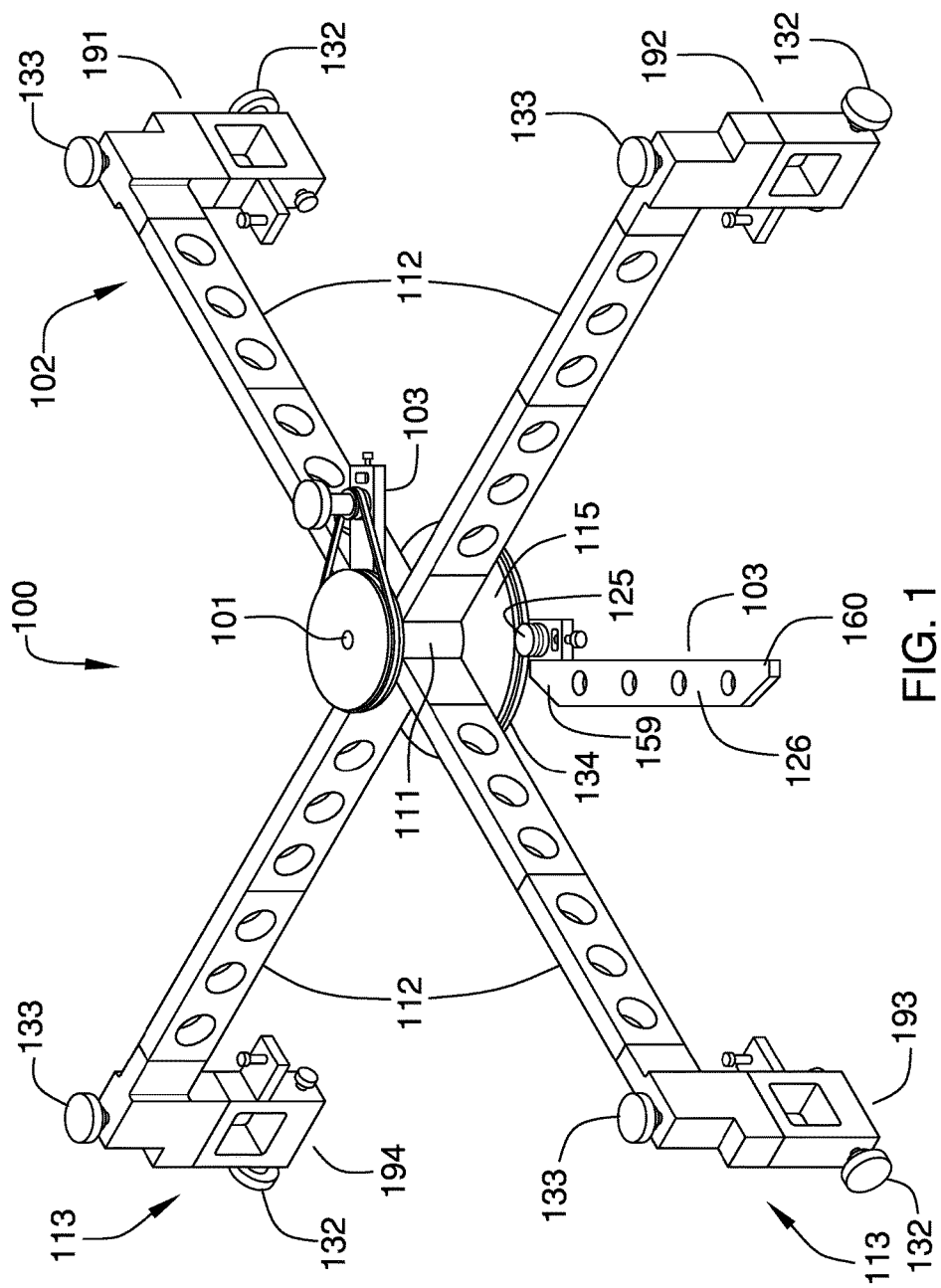
FIG. 1 is a perspective view of an embodiment of the disclosure.
Figure 2:
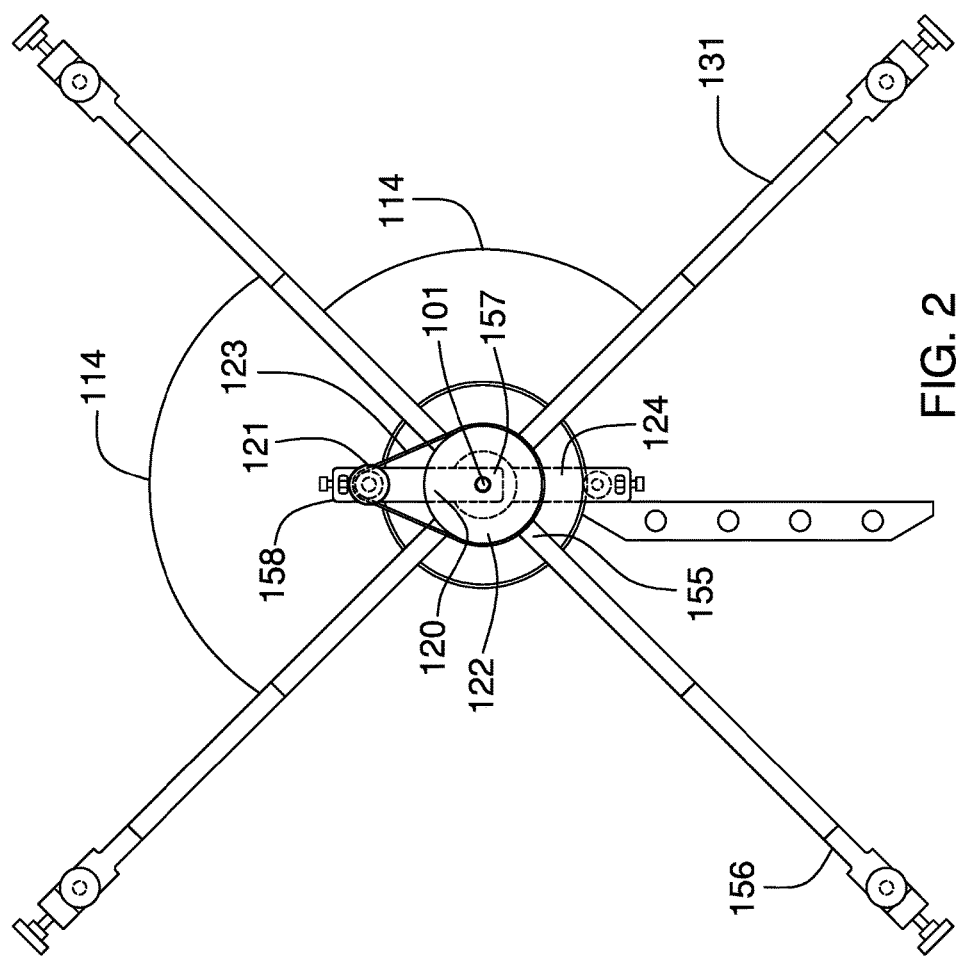
FIG. 2 is a top view of an embodiment of the disclosure.
Figure 3:
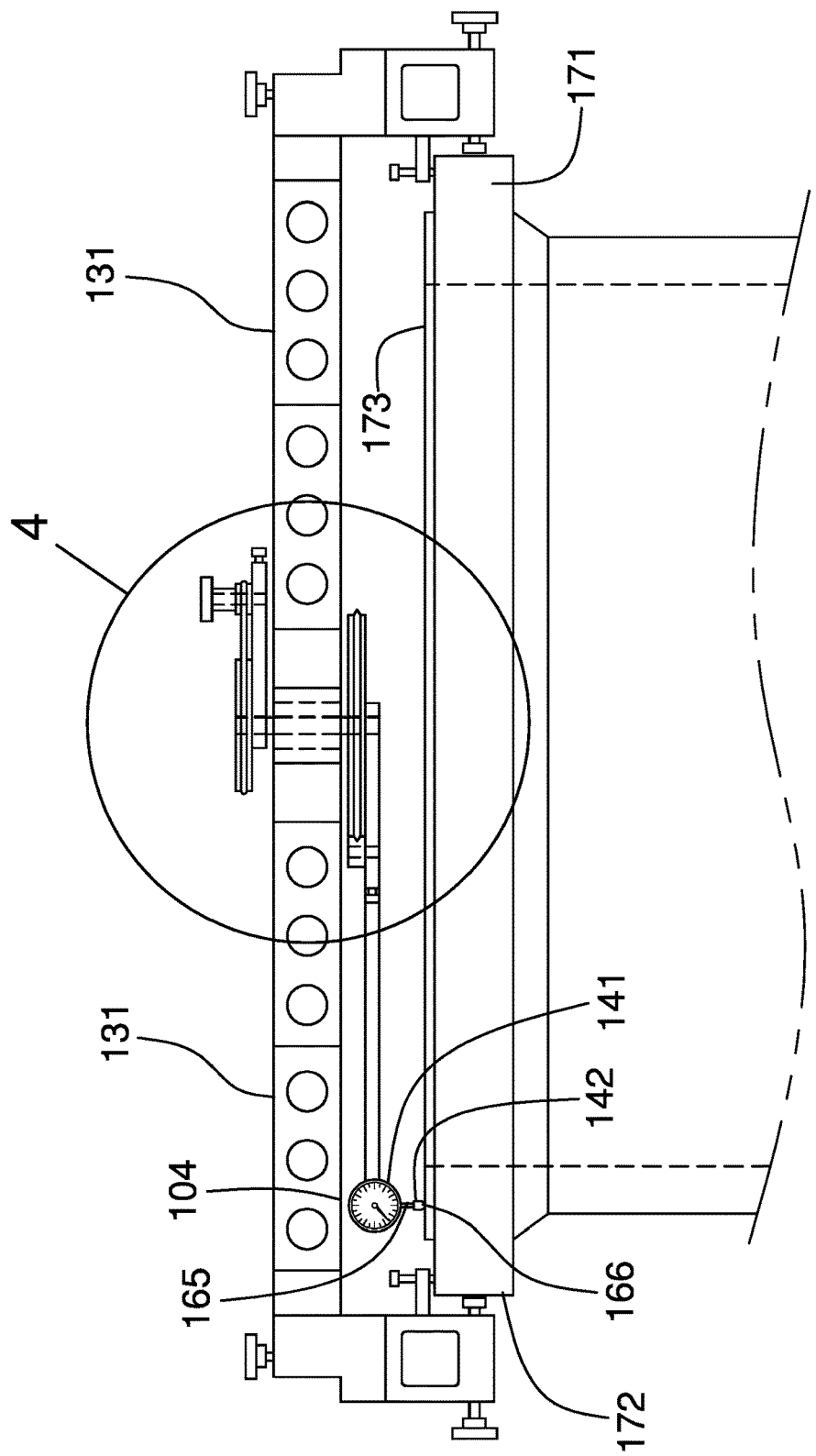
FIG. 3 is a side view of an embodiment of the disclosure.
Figure 4:
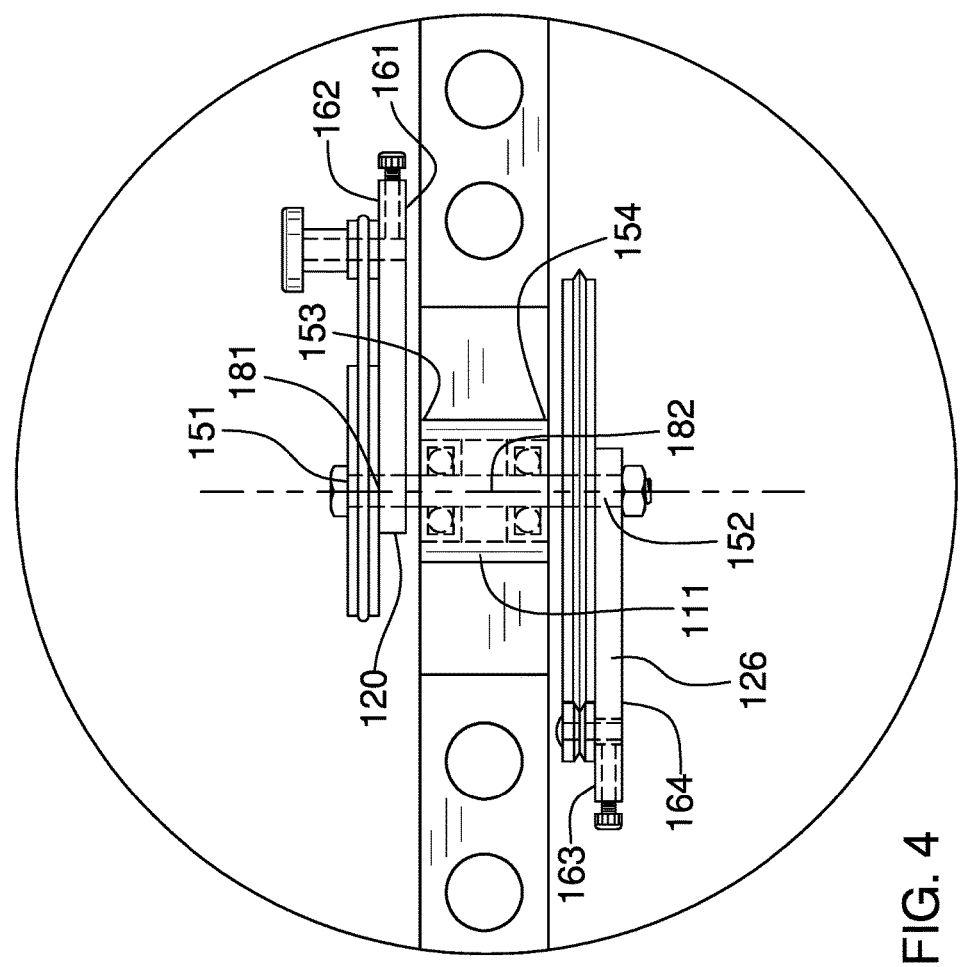
FIG. 4 is a detail view of an embodiment of the disclosure.
Figure 5:
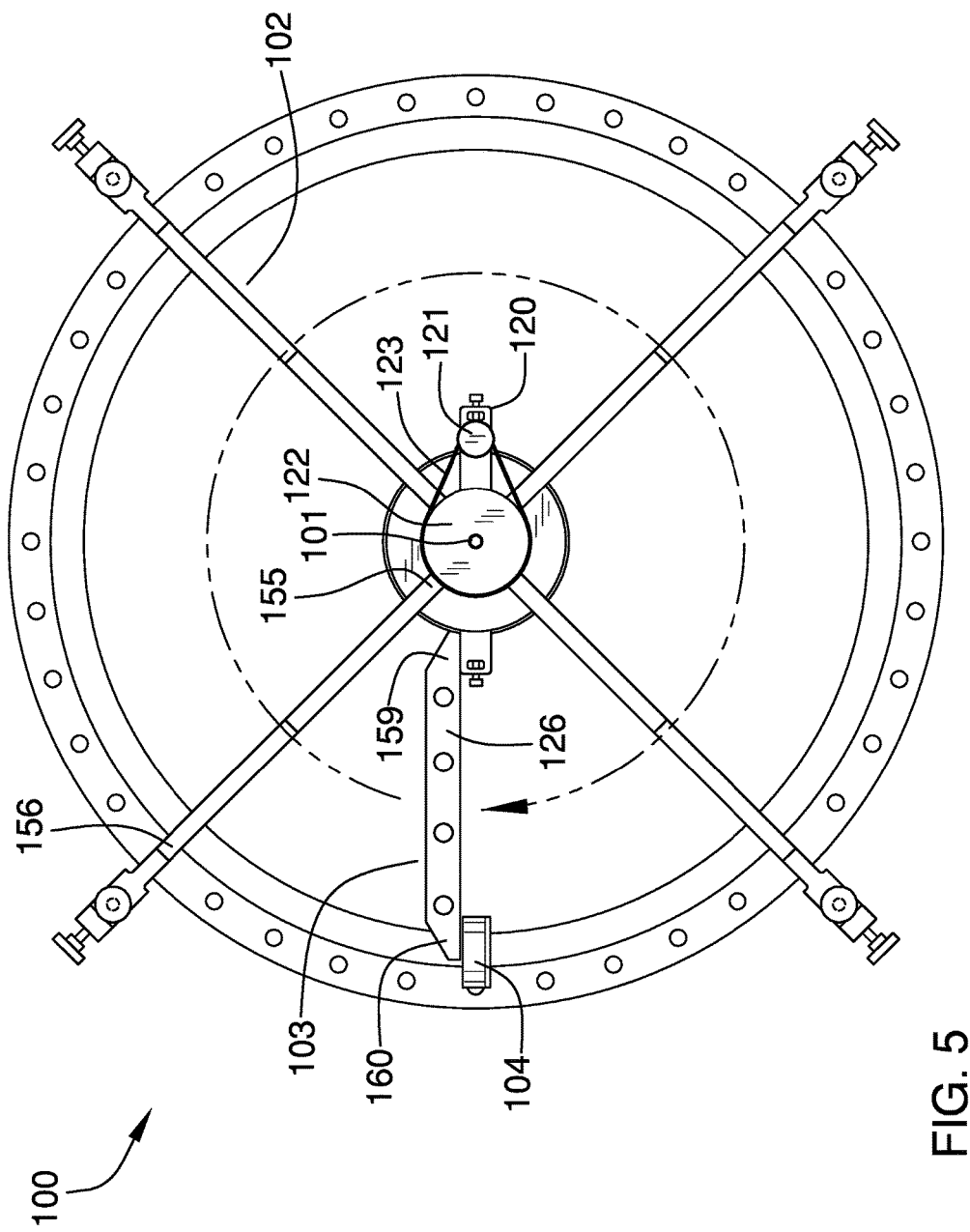
FIG. 5 is an in-use view of an embodiment of the disclosure.

Detailed reference will now be made to one or more potential embodiments of the disclosure, which are illustrated in FIGS. 1 through 5.

The flange checking device 100 (hereinafter invention) is an instrument that is configured for use in measuring the runout of a flange 171. The flange 171 is further defined with a flange 171 edge 172 and a flange 171 face 173. The invention 100 measures lateral irregularities in the face 173 of the flange 171 that can cause failures in seals the flange 171 may form. The invention 100 comprises a center shaft 101, a mounting structure 102, a measuring structure 103, and a measuring instrument 104. The mounting structure 102 is a first adjustable structure that physically attaches the invention 100 to the edge 172 of the flange 171 that is to be inspected. The measuring structure 103 is a second adjustable structure that applies the measuring instrument 104 to the flange 171 face 173. The measuring instrument 104 measures irregularities within the flange 171 face 173.

Within this disclosure, the flange 171 refers to a flange 171 that is to be tested by the invention 100. The flange 171 edge 172 refers to the perimeter of the flange 171. The flange 171 face 173 refers to the face 173 of the flange 171 that is intended to be sealed.

The center shaft 101 is a commercially available cylindrical bar that forms the center of the invention 100. While technically a part of the measuring structure, the center shaft 101 forms a central hub around which the invention 100 is assembled and which will be used as a reference point throughout this disclosure. The center shaft 101 is further defined with a first end 151, a second end 152, and a shaft center axis 181. The first end 151 is the end of the center shaft 101 that is distal from the guide disk 115. The second end 152 is the end of the center shaft 101 that is distal from the first end 151. The shaft center axis 181 is the center axis of the cylindrical structure that forms the center shaft 101.

The mounting structure 102 is a first structure that attaches the invention 100 to the flange 171 edge 172 such that the measuring instrument 104 is facing the surface of the flange 171 face 173 to be measured. The mounting structure 102 comprises a central cylinder 111, a plurality of legs 112, an individual leg 113, an angular spacing 114, and a guide disk 115.

The central cylinder 111 is a cylindrical structure to which the plurality of legs 112 are attached. The central cylinder 111 is further defined with a third end 153, a fourth end 154, and a cylinder center axis 182. The third end 153 is the end of the central cylinder 111 that is distal from the guide disk 115. The fourth end 154 is the end of the central cylinder 111 that is proximal to the guide disk 115. The cylinder center axis 182 is the center axis of the cylindrical structure that forms the central cylinder 111.

The plurality of legs 112 forms the apparatus that physically attaches the invention 100 to the flange 171 edge 172. Each of the plurality of legs 112 attaches to the central cylinder 111 such that each of the plurality of legs 112 projects radially away from the central cylinder 111. The span of the length of each of the plurality of legs 112 is adjustable such that the plurality of legs 112 can be used to attach to flanges 171 of a variety of diameters. The plurality of legs 112 comprises a collection of individual legs 113. Each individual leg 113 comprises an adjustable extension 131, a radial clamp 132, and a lateral clamp 133.

The individual leg 113 refers to a leg selected from the plurality of legs 112. Each individual leg 113 selected from the plurality of legs 112 is identical. The individual leg 113 is formed in a telescopic manner such that the span of the length of each individual leg 113 can be adjusted.

The angular spacing 114 is measure of the arc between a first individual leg 113 selected from the plurality of legs 112 and a second adjacent individual leg 113 selected from the plurality of legs 112. The angular spacing 114 is measured using the shaft center axis 181 of the center shaft 101 as the vertex of the angular spacing 114. The angular spacing 114 between any first selected individual leg 113 and any second adjacent individual leg 113 is identical.

The guide disk 115 is a disk-shaped structure that ensures that the measuring structure 103 will rotate in a fixed plane. The guide disk 115 comprises a roller track 134. The roller track 134 is a groove formed in the perimeter of the guide disk 115. The roller track 134 is sized to receive the guide roller 125.

The adjustable extension 131 forms the telescopic structure of the individual leg 113 that separates the radial clamp 132 and the lateral clamp 133 from the central cylinder 111. The adjustable extension 131 is further defined with a fifth end 155 and a sixth end 156. The fifth end 155 of the adjustable extension 131 is the end that is distal to the sixth end 156. The sixth end 156 of the adjustable extension 131 is the end that is proximal to the radial clamp 132 and the lateral clamp 133.

The radial clamp 132 is a mechanical device that attaches the fourth end 154 of the adjustable extension 131 to the flange 171 edge 172 from the radial direction. The lateral clamp 133 is a mechanical device that attaches the fourth end 154 of the adjustable extension 131 to the flange 171 edge 172 from the lateral direction. Methods to form clamps to perform the functions of the radial clamp 132 and the lateral clamp 133 are well known and documented in the mechanical arts.

In the first potential embodiment of the disclosure, the plurality of legs 112 comprises a first leg 191, a second leg 192, a third leg 193, and a fourth leg 194. The first leg 191 refers to a specific leg selected from the plurality of legs 112. The second leg 192 refers to a specific leg selected from the plurality of legs 112. The third leg 193 refers to a specific leg selected from the plurality of legs 112. The fourth leg 194 refers to a specific leg selected from the plurality of legs 112.

The measuring structure 103 is a second structure that attaches the measuring instrument 104 to the mounting structure 102. The measuring structure 103 rotates in such a manner that the measuring instrument 104 can be rotated around the flange 171 face 173 during the testing procedure. The measuring structure 103 is adjustable such that the measuring instrument 104 can be applied to flange 171 faces 173 of various diameters. The measuring structure 103 comprises a handle 121, a drive pulley 122, a drive belt 123, a transfer bar 124, a guide roller 125, a mounting bar 126, and a handle bar 120.

The handle bar 120 is further defined with a seventh end 157, an eighth end 158, a first medial surface 161, and a first distal surface 162. The mounting bar 126 is further defined with a ninth end 159 and a tenth end 160, a second medial surface 163, and a second distal surface 164.

The seventh end 157 of the handle bar 120 is proximal to the central cylinder 111. The eighth end 158 of the handle bar 120 is distal from the seventh end 157. The ninth end 159 of the mounting bar 126 is proximal to the guide disk 115. The tenth end 160 of the mounting bar 126 is distal from the ninth end 159. The first medial surface 161 of the handle bar 120 is distal from the first distal surface 162. The first distal surface 162 of the handle bar 120 has the handle 121 mounted on it. The second medial surface 163 of the mounting bar 126 has the guide roller 125 mounted on it. The second distal surface 164 of the mounting bar 126 is distal from the second medial surface 163.

The handle 121 is an isolated grip that is used to rotate the measuring structure 103 around the flange 171 face 173. By isolated is meant that any pressure applied to the handle 121 will not be detected by the measuring instrument 104.

The drive pulley 122 is a pulley that is rotated by the handle 121. The drive pulley 122 rotates the center shaft 101. The drive belt 123 is an elastic loop that transfers the rotation of the handle 121 to the drive pulley 122. The use of the drive belt 123 prevents the transfer of torque from the handle 121 to the rest of the measuring structure 103.

The handle bar 120 is a metal plate that: 1) is attached to the central cylinder 111 in the manner of a cantilever; and, 2) projects radially away from the central cylinder 111. The handle 121 attaches to the handle bar 120 such that the handle 121 can be rotated to rotate the drive belt 123. By attaching the handle 121 to the handle bar 120, any torque applied to the handle 121 is borne by the mounting structure 102 instead of the measuring structure 103.

The guide roller 125 is a rotating tracking device. The guide roller 125 is a ridged structure that is inserted into the roller track 134 of the guide disk 115.

In the first potential embodiment of the disclosure, the transfer bar 124 is a metal substructure that attaches the mounting bar 126 and the guide roller 125 to the center shaft 101 for structural support purposes. For the purpose of understanding the inventive concept of the disclosure, the transfer bar 124 will be ignored, however, the use of a transfer bar 124 is recommended for use in embodiments of the invention 100

The guide roller 125 is attached to the mounting bar 126. The purpose of the guide roller 125 is to ensure that the mounting bar 126 will rotate in a fixed plane.

The mounting bar 126 is a metal plate structure that is attached to the center shaft 101 such that: 1) the mounting bar 126 projects radially away from the center shaft 101; and, 2) the mounting bar 126 will rotate when the center shaft 101 is rotated by the handle 121. The mounting bar 126 effectively attaches to the center shaft 101 in the manner of a cantilever in that the end of the mounting bar 126 that is distal from the center shaft 101 is free. The mounting bar 126 is formed in a telescopic manner such that the span of the length of the mounting bar 126 can be adjusted to the diameter of the flange 171 being inspected.

The measuring instrument 104 attaches to the mounting bar 126 at the end that is distal from the center shaft 101 (tenth end 160).

The measuring instrument 104 is a readily and commercially available device that is used to measure the flange 171 face 173 for runout. The measuring instrument 104 determines runout by detecting variations of distance between the measuring instrument 104 and the flange 171 face 173. The measuring instrument 104 comprises a micrometer 141 and a probe 142. The probe 142 is further defined with a first fixed end 165 and a first free end 166. The first fixed end 165 of the probe 142 attaches to the micrometer 141. The first free end 166 of the probe 142 is distal from the first fixed end 165.

The micrometer 141 is a readily and commercially available measurement device that is used to measure the distance from the mounting bar 126 to the flange 171 face 173. The probe 142 is a shaft that makes a physical connection between the flange 171 face 173 and the micrometer 141. The runout of a flange 171 face 173 is determined from deflections in the probe 142 that: 1) are assumed to be caused by the flange 171 face 173: and, 2) that are detected by the micrometer 141.

The assembly of the invention 100 is described in the following 5 paragraphs.

The center shaft 101 is mounted in a coaxial manner within the central cylinder 111 such that the center shaft 101 rotates freely. The shaft center axis 181 of the center shaft 101 is aligned with the cylinder center axis 182 of the central cylinder 111.

The fifth end 155 of each adjustable extension 131 attaches to the central cylinder 111 such that the adjustable extension 131 projects radially away from the cylinder center axis 182 of the central cylinder 111. The radial clamp 132 and the lateral clamp 133 of each individual leg 113 attaches to the sixth end 156 of the adjustable extension 131. Each of the plurality of legs 112 are attached to the central cylinder 111 such that every measured angular spacing 114 is identical.

The fifth end 155 of the handle bar 120 attaches to the central cylinder 111 such that the handle bar 120 projects radially away from the cylinder center axis 182. The handle 121 attaches to the sixth end 156 of the first distal surface 162 of the handle bar 120 at the sixth end 156. The drive belt 123 attaches the handle 121 to the drive pulley 122 such that the rotation of the handle 121 rotates the drive pulley 122.

The guide disk 115 attaches to the fourth end 154 of the central cylinder 111 such that the face of the guide disk 115 is perpendicular to the shaft center axis 181. The drive pulley 122 attaches to the first end 151 of the center shaft 101 such that the plane of rotation of the drive pulley 122 is perpendicular to the shaft center axis 181. The ninth end 159 of the mounting bar 126 attaches to the second end 152 of the center shaft 101. The guide roller 125 attaches to the second medial surface 163 of the mounting bar 126. The guide roller 125 is mounted such that the guide roller 125 can be inserted into the roller track 134.

The micrometer 141 attaches to the tenth end 160 of the mounting bar 126 such that the probe 142 projects in a lateral direction away from the drive pulley 122.

The following definitions were used in this disclosure:

Cant: As used in this disclosure, a cant is an angular deviation from one or more reference planes such as a vertical plane or a horizontal plane.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Center of Rotation: As used in this disclosure, the center of rotation is the point of a rotating plane that does not move with the rotation of the plane. A line within a rotating three dimensional object that does not move with the rotation of the object is also referred to as an axis of rotation.

Coaxial: As used in this disclosure, coaxial is an term that refers to a first object that is inserted or contained within a second object such: 1) that the first object and the second object share the same center point if the or first object and the second object are treated as a two dimensional objects; or, 2) that the first object and the second object share the same center axis if the or first object and the second object are treated as three dimensional objects.

Cylinder: As used in this disclosure, a cylinder is a geometric structure defined by two identical flat and parallel ends, also commonly referred to as bases, which are circular in shape and connected with a single curved surface, referred to in this disclosure as the face. The cross section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the perimeter or boundary of the object through which the line segment of the diameter runs.

Distal: As used in this disclosure, the term distal is used to describe the relative location of two objects. The distal object is: 1) the object that is further from a previously specified center axis when the direction of comparison is the radial direction; and 2) the object that is further from a center point on a center axis when the direction of comparison is in the lateral direction.

Elastic: As used in this disclosure, an elastic is a material or object that deforms when a force is applied to it and that is able to return to its original shape after the force is removed. A material that exhibits these qualities is also referred to as an elastomeric material.

Flange: As used in this disclosure, a flange is a (often protruding) rib, edge, or collar that is used to hold an object in place or to attach a first object to a second object.

Grip: As used in this disclosure, a grip is an accommodation formed within an object that allows the object to be grasped by a hand.

Handle: As used in this disclosure, a handle is an object by which a tool, object, or door is held or manipulated with the hand.

Lateral: As used in this disclosure, the term lateral refers to a direction that is parallel to a previously identified central axis.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Medial: As used in this disclosure, the term medial is used to describe the relative location of two objects. The medial object is: 1) the object that is closer to a previously specified center axis when the direction of comparison is the radial direction; and 2) the object that is closer to a center point on a center axis when the direction of comparison is in the lateral direction.

Radial: As used in this disclosure, the term lateral refers to a direction that is perpendicular to a previously identified central axis.

Runout: As used in this disclosure, the term runout refers to an irregularity or cant in the lateral direction of: 1) a face of a disk or flange; or, 2) a plane of rotation of a disk.

Telescopic: As used in this disclosure, telescopic is an adjective that describes an object made of sections that fit or slide into each other such that the object can be made longer or shorter by adjusting the relative positions of the sections.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An inspection instrument comprising:
a center shaft, a mounting structure, a measuring structure, and a measuring instrument;
wherein the inspection instrument is configured for use in measuring the runout of a flange;
wherein the flange is further defined with a flange edge and a flange face; wherein the mounting structure is a first adjustable structure that physically attaches the inspection instrument to the flange;
wherein the measuring structure is a second adjustable structure that applies the measuring instrument to the flange face;
wherein the measuring instrument measures irregularities within the flange face;
wherein the center shaft is a cylindrical bar;
wherein the center shaft is further defined with a first end, a second end, and a shaft center axis.

2. The inspection instrument according to claim 1
wherein the mounting structure comprises a central cylinder, a plurality of legs, an angular spacing, and a guide disk;
wherein the plurality of legs and the guide disk are attached to the central cylinder;
wherein the angular spacing is measure of the arc between a first individual leg selected from the plurality of legs and a second adjacent individual leg selected from the plurality of legs;
wherein the angular spacing is measured using the shaft center axis of the center shaft as the vertex of the angular spacing.

3. The inspection instrument according to claim 2
wherein the measuring structure comprises a handle, a drive pulley, a drive belt, a guide roller, a mounting bar, and a handle bar;
wherein the handle bar attaches the handle to the mounting structure;
wherein the drive belt connects the handle to the pulley;
wherein the center shaft attaches the drive pulley to the mounting bar;
wherein the guide roller and the measuring instrument are attached to the mounting bar;
wherein the handle bar is further defined with a seventh end, an eighth end, a first medial surface, and a first distal surface;
wherein the mounting bar is further defined with a ninth end and a tenth end, a second medial surface, and a second distal surface.

4. The inspection instrument according to claim 3
wherein the measuring structure rotates in such a manner that the measuring instrument can be rotated around the flange face during the testing procedure;
wherein the measuring structure is adjustable such that the measuring instrument can be applied to flange faces of various diameters.

5. The inspection instrument according to claim 4
wherein the central cylinder is a cylindrical structure;
wherein the central cylinder is further defined with a third end, a fourth end, and a cylinder center axis;
wherein the guide disk attaches to the fourth end of the central cylinder.

6. The inspection instrument according to claim 5
wherein the plurality of legs physically attach the inspection instrument to the flange edge;
wherein each of the plurality of legs attaches to the central cylinder such that each of the plurality of legs projects radially away from the central cylinder;

wherein the span of the length of each of the plurality of legs is adjustable;
wherein each individual leg selected from the plurality of legs is identical.

7. The inspection instrument according to claim 6
wherein the plurality of legs comprises a collection of individual legs;
wherein each individual leg comprises an adjustable extension, a radial clamp, and a lateral clamp;
wherein the adjustable extension attaches the radial clamp and the lateral clamp to the central cylinder.

8. The inspection instrument according to claim 7
wherein the adjustable extension is formed in a telescopic manner such that the span of the length of each individual leg can be adjusted;
wherein the adjustable extension separates the radial clamp and the lateral clamp from the central cylinder;
wherein the adjustable extension is further defined with a fifth end and a sixth end.

9. The inspection instrument according to claim 8 wherein the angular spacing between any first selected individual leg and any second adjacent individual leg is identical.

10. The inspection instrument according to claim 9 wherein the guide disk is a disk-shaped structure that determines a fixed plane within which the measuring structure will rotate.

11. The inspection instrument according to claim 10
wherein the guide disk further comprises a roller track;
wherein the roller track is a groove formed in the perimeter of the guide disk.

12. The inspection instrument according to claim 11 wherein the radial clamp is a mechanical device that attaches the fourth end of the adjustable extension to the flange edge from the radial direction.

13. The inspection instrument according to claim 12 wherein the lateral clamp is a mechanical device that attaches the fourth end of the adjustable extension to the flange edge from the lateral direction.

14. The inspection instrument according to claim 13
wherein the handle is an isolated grip;
wherein by isolated is meant that any pressure applied to the handle will not be detected by the measuring instrument;
wherein the drive pulley is a pulley that is rotated by the handle;
wherein the drive belt is an elastic loop that transfers the rotation of the handle to the drive pulley;
wherein the drive pulley rotates the center shaft.

15. The inspection instrument according to claim 14
wherein the handle bar is a metal plate is attached to the central cylinder in the manner of a cantilever;
wherein the handle bar projects radially away from the central cylinder;
wherein the handle attaches to the handle bar such that the handle can be rotated.

16. The inspection instrument according to claim 15
wherein the guide roller is a rotating tracking device;
wherein the guide roller is a ridged structure that is inserted into the roller track of the guide disk;
wherein the guide roller ensures that the mounting bar will rotate in the fixed plane of the guide disk.

17. The inspection instrument according to claim 16
wherein the mounting bar is a metal plate structure that is attached to the center shaft such that the mounting bar projects radially away from the center shaft;
wherein the mounting bar is a metal plate structure that is attached to the center shaft such that the mounting bar will rotate when the center shaft is rotated by the handle.

18. The inspection instrument according to claim 17 wherein the mounting bar is formed in a telescopic manner such that the span of the length of the mounting bar can be adjusted to the diameter of the flange being inspected.

19. The inspection instrument according to claim 18
wherein the measuring instrument comprises a micrometer and a probe;
wherein the probe is further defined with a first fixed end and a first free end;
wherein the first fixed end of the probe attaches to the micrometer;
wherein the first free end of the probe is distal from the first fixed end;
wherein the probe is a shaft that makes a physical connection between the flange face and the micrometer.

20. The inspection instrument according to claim 19
wherein the center shaft is mounted in a coaxial manner within the central cylinder such that the center shaft rotates freely;
wherein the shaft center axis of the center shaft is aligned with the cylinder center axis of the central cylinder;
wherein the fifth end of each adjustable extension attaches to the central cylinder such that the adjustable extension projects radially away from the cylinder center axis of the central cylinder;
wherein the radial clamp and the lateral clamp of each individual leg attaches to the sixth end of the adjustable extension;
wherein each of the plurality of legs are attached to the central cylinder such that every measured angular spacing is identical;
wherein the fifth end of the handle bar attaches to the central cylinder such that the handle bar projects radially away from the cylinder center axis;
wherein the handle attaches to the sixth end of the first distal surface of the handle bar at the sixth end;
wherein the drive belt attaches the handle to the drive pulley such that the rotation of the handle rotates the drive pulley;
wherein the guide disk attaches to the fourth end of the central cylinder such that the face of the guide disk is perpendicular to the shaft center axis;
wherein the drive pulley attaches to the first end of the center shaft such that the plane of rotation of the drive pulley is perpendicular to the shaft center axis;
wherein the ninth end of the mounting bar attaches to the second end of the center shaft;
wherein the guide roller attaches to the second medial surface of the mounting bar;
wherein the guide roller is mounted such that the guide roller can be inserted into the roller track;
wherein the micrometer attaches to the tenth end of the mounting bar such that the probe projects in a lateral direction away from the drive pulley;
wherein the roller track is sized to receive the guide roller.

* * * * *